United States Patent Office 3,102,387
Patented Sept. 3, 1963

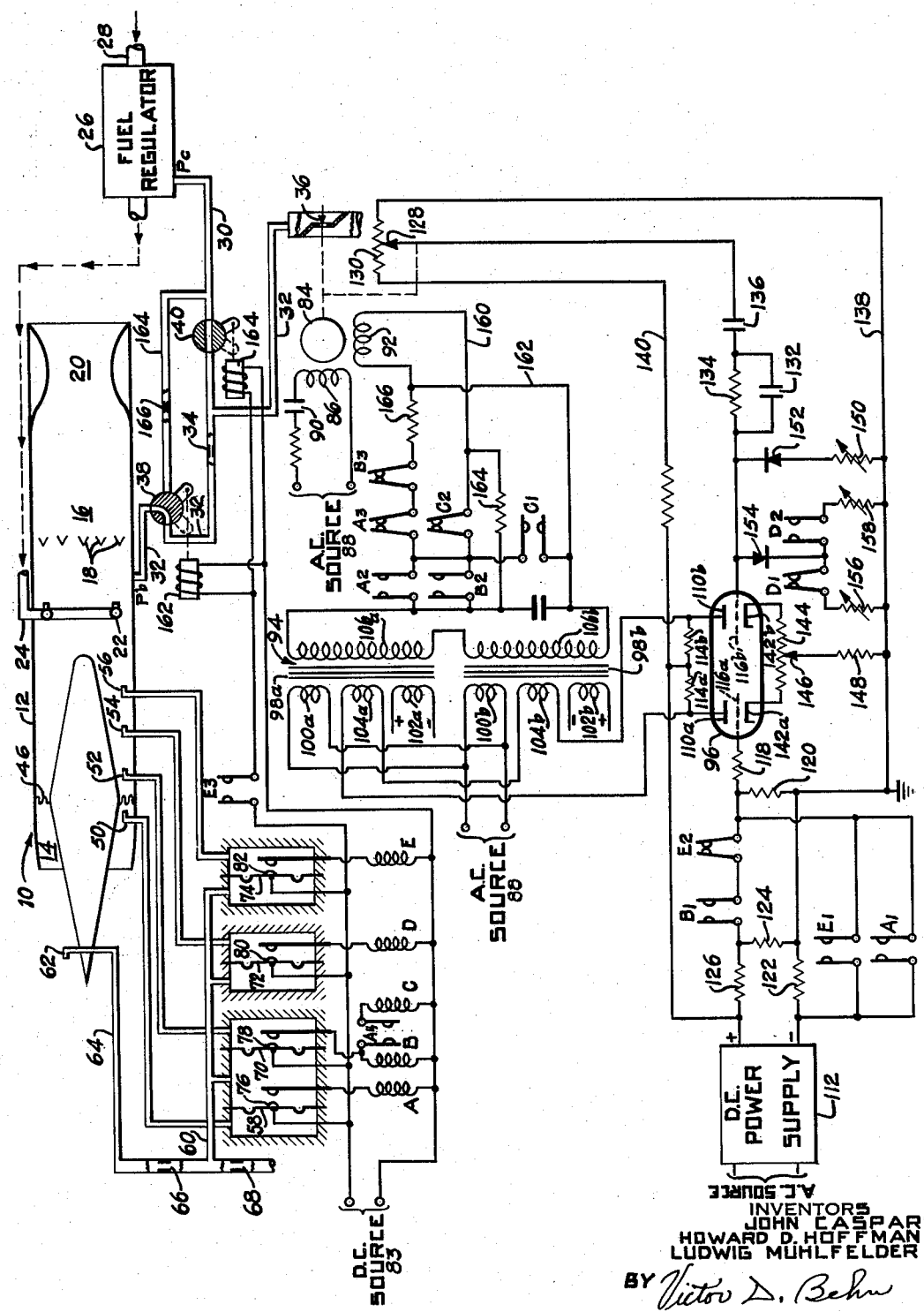

3,102,387
SHOCK POSITIONING CONTROL SYSTEM
John Caspar, Verona, N.J., Howard D. Hoffman, Cincinnati, Ohio, and Ludwig Muhlfelder, Livingston, N.J., assignors to Curtiss-Wright Corporation, a corporation of Delaware
Filed Apr. 20, 1959, Ser. No. 807,520
13 Claims. (Cl. 60—35.6)

This invention relates to jet engines and is particularly directed to a control system for a jet engine designed for a supersonic flight.

The invention is primarily for use in a ramjet type jet engine and is an improvement over the invention disclosed in copending application Serial No. 543,882, filed October 31, 1955, now Patent No. 2,959,000.

An air breathing jet engine, such as a ramjet engine, designed for supersonic flight requires an air inlet having supersonic entering air flow to supply the mass air flow requirements of the engine. Within the engine, however, the air velocity generally must be subsonic for efficient combustion. Hence, the engine air inlet structure should reduce the supersonic entering air velocity to a subsonic value and for efficient operation this should be done with a minimum loss of total pressure of said air. When the inlet is so operating there is a maximum conversion of the velocity head of the entering air to pressure. That is, the inlet is operating with high pressure recovery.

A supersonic air inlet generally has a throat downstream of its leading edge. With supersonic entering air flow, the inlet is said to have "started" when the transition from supersonic inlet air flow occurs at the inlet throat or at some point downstream therefrom. This transition within the inlet from supersonic to subsonic flow is marked by a strong or so-called normal compression shock.

As pointed out in said copending application, the actual position of said normal inlet shock can be controlled by varying the flow resistance in the engine downstream of said shock so as to vary the pressure downstream of said normal shock. For example, any increase or decrease in said flow resistance results in an increase or decrease respectively in said downstream pressure to cause upstream or downstream movement respectively of said normal shock.

As also pointed out in said copending application, for stable operation said inlet normal shock should be disposed at the inlet throat or downstream therefrom and that if the inlet is operating at too high a pressure recovery, that is, at too high a pressure downstream of the inlet normal shock, the position of said inlet normal shock becomes unstable such that the shock oscillates back and forth into and out of the inlet. This type of inlet instability is generally known as "buzz" and is highly undesirable because of the severe pressure fluctuations resulting from rapid oscillation of the inlet shock wave.

It is known that the pressure recovery of a supersonic jet engine air inlet is a maximum when the inlet normal shock is at the inlet throat. Said copending application discloses a system for controlling a supersonic jet engine such that inlet normal shock is maintained close to but downstream of the inlet throat but not so close that the inlet is in danger of becoming unstable because of buzz.

An object of the present invention comprises the provision of a novel control system for an air breathing supersonic jet engine such that the inlet normal shock can be maintained even closer to the inlet throat without danger of inlet instability. The control system of the present invention thereby provides for engine operation at a pressure recovery which is even higher than is possible with the control system of said copending application.

A further object of the invention comprises the provision of a novel system for maintaining the position of the inlet normal shock of an air breathing supersonic jet engine within a predetermined zone within the inlet such that upon departure of said shock beyond said zone the speed of the corrective action for returning the shock to a position within said range depends on the direction said shock wave moves beyond said zone. In addition the system of the present invention is an integrating type of control system in that the motor for effecting the corrective action for returning the inlet normal shock to said predetermined zone operates continuously whenever the shock is outside said zone and in this way eliminates the so-called droop error inherent in any proportional type of control system, for example such as disclosed in said copending application.

A still further object of the invention comprises the provision of such a control system in which, upon downstream movement of the inlet normal shock wave beyond its desired position, the speed of the corrective action depends on the extent of said movement.

Other objects of the invention will become apparent upon reading the annexed detailed description in connection with the drawing which is a schematic view of a ramjet engine and control system embodying the invention.

Referring to the drawing, a ramjet engine is schematically indicated at 10. As illustrated the ramjet engine 10 comprises a duct or housing member 12 having an air inlet passage 14, a combustion chamber 16 having a flame holder structure 18 at its upstream end and an exhaust nozzle 20 through which the engine exhaust gases discharge rearwardly into the surrounding atmosphere.

Fuel for combustion with air entering through the inlet passage 14 is discharged into the duct 12 by a fuel ring or manifold 22 preferably disposed upstream of the flameholder structure 18. The fuel supplied to the fuel ring 22 is supplied by a fuel conduit 24 under control of a fuel regulating device 26.

The fuel regulating device 26 is supplied with fuel under pressure from a supply conduit 28 and said device regulates the flow of fuel to the engine supply conduit 24 in response to a control pressure Pc supplied to the device 26 by a pressure line 30 such that said fuel flow is proportional to said pressure. Prior Patents 2,766,-579 and 2,834,375 as well as said copending application all disclose such a fuel regulating device. Accordingly, no further description of the fuel regulator 26 is considered necessary herein.

The regulator control pressure Pc is selected so that it is proportional to the mass air flow into the engine. With such a control pressure the regulator 26 serves to regulate the fuel flow in proportion to the mass air flow to the engine combustion chamber 16. In this way the regulator 26 serves to maintain a predetermined fuel-air ratio of the engine combustion mixture.

This fuel-air ratio can be varied by varying the proportionality between the control pressure Pc and the engine mass air flow. For this purpose a fluid passage 32 communicates at one end with the engine motive fluid path at the entrance to the engine burner or combustion chamber 16 to provide a pressure equal to the static pressure Pb at this point. This static pressure Pb is a measure or signal of the engine mass air flow as explained in said copending application. The other end of the line 32 communicates with a source of lower pressure so that the line 32 provides a fluid leakage or bleed path. A pair of restrictions 34 and 36 are serially disposed in the line 32 and the restriction 36 is variable. The control pressure line 30 communicates with the line 32 between the restrictions 34 and 36. The line 32 includes a two-way valve 38 upstream of the restriction 34 and the line 30 includes a shut-off valve 40.

During engine operation the valves 38 and 40 are normally in the positions illustrated and when so positioned the control pressure $Pc$ for the regulator 26 is equal to the pressure between the restrictions 34 and 36 whereupon said pressure $Pc$ is a fraction of the mass air flow pressure $Pb$. With this arrangement the control pressure $Pc$ is proportional to the mass air flow pressure $Pb$ and the ratio of the pressures $Pc$ to $Pb$ increases and decreases as the variable restriction 36 is adjusted in a closing or opening direction respectively. Accordingly, the fuel-air ratio maintained by the regulator 26 is changed when the adjustment of the variable restriction or bleed valve 36 is changed.

If the pressure drop across the variable restriction 36 is above the critical pressure ratio the constant of proportionality between the pressures $Pc$ and $Pb$ is independent of variations in the pressure downstream of said variable restriction.

With the construction so far described an opening adjustment of the restriction 36 reduces the ratio of the control pressure $Pc$ to the pressure $Pb$ with the result that the fuel regulator 26 will then reduce the fuel flow to maintain a lower fuel-air ratio of the engine combustion mixture. This reduction of the engine fuel-air ratio reduces the flow resistance of the gases through the ramjet duct 12 to reduce the back pressure (downstream pressure) on the inlet normal shock 46 whereupon said inlet shock moves in a downstream direction into the inlet. Conversely a closing adjustment of the variable restriction 36 increases the ratio of the control pressure $Pc$ to the pressure $Pb$ so that the fuel regulator 26 now operates to increase the fuel flow so as to maintain a higher fuel-air ratio of the engine combustion mixture. This increase of the engine fuel-air ratio increases the flow resistance of the gases through the ramjet duct 12 to increase the back pressure on the inlet normal shock 46 whereupon said inlet shock moves in an upstream direction.

In this way the position of the normal shock can be controlled by adjusting the bleed valve 36 to vary the engine fuel-air ratio. The bleed valve 36 is controlled in response to signals produced by axially-spaced pressure taps 50, 52, 54 and 56 in the engine air inlet passage 14. There is a sharp pressure rise across the inlet normal shock 46 and said pressure taps 50, 52, 54 and 56 use this pressure rise for sensing the position of said inlet shock.

The pressure tap 50 is disposed adjacent to the inlet throat and the tap 52 is a short distance downstream therefrom to define a range of movement therebetween for the shock 46 within which it is desired to keep said shock during normal engine operation. Pressure tap 54 is downstream of said desired range and tap 56 is further downstream.

The pressure tap 50 is connected to one side of a flexible diaphragm 58. The other side of this flexible diaphragm is subject to a suitable reference pressure supplied by a line 60. This reference pressure may be obtained from an impact pressure 62 in the entering air stream and connected to a bleed passage 64 having a pair of serially disposed restrictions 66 and 68. The reference pressure line 60 is connected to the passage 64 intermediate its restrictions. The magnitude of the reference pressure is determined by the relative sizes of the restrictions 66 and 68 which are set so that said reference pressure is higher than the static pressure at the tap 50 when the shock 46 is downstream of the tap 50, as illustrated, and is lower than that at said tap when said shock is upstream of said tap.

The pressure tap 52 is connected to one side of a flexible diaphragm 70. Similarly the pressure taps 54 and 56 are connected to one side of flexible diaphragms 72 and 74 respectively. The other side of each of the flexible diaphragms 70, 72 and 74 is connected to said reference pressure line 60 or to some other suitable reference pressure.

The flexible diaphragms 58, 70, 72 and 74 control electric switch contacts 76, 78, 80 and 82 respectively. With the arrangement described, the pressure rise across the inlet normal shock is effective to move said flexible diaphragms 58, 70, 72 and 74 to open or close their respective switch contacts as said inlet shock moves from one side to the other of the associated pressure taps 50, 52, 54 and 56 of said diaphragms. Thus the flexible diaphragm 58 opens the contact 76 when as illustrated the normal shock 46 is downstream of the associated static pressure tap 50 and closes said switch whenever said shock moves upstream of the tap 50. The flexible diaphragm 70 opens the electric switch contact 78 when as illustrated the normal shock is upstream of the associated static pressure tap 52 and closes said switch whenever said shock 46 moves downstream of said tap 52. Similarly the flexible diaphragms 72 and 74 open their respective switch contacts 80 and 82 when as illustrated the normal shock 46 is upstream of their associated static pressure taps 54 and 56 and closes their respective switch contacts whenever said shock 46 moves downstream of said taps.

The switches 76, 78, 80 and 82 are therefore responsive to movements of the inlet normal shock 46 and these switches control the circuits for electric relays A, B, C, D, and E to a source of direct current (D.C.) 83. The relay A has contacts A1, A2, A3 and A4 of which, when as illustrated the relay is deenergized, the contact A3 is closed and A1, A2 and A4 are open. The relay B has contacts B1, B2 and B3 of which, when as illustrated the relay is de-energized, the contact B3 is closed and B1 and B2 are open. The relay C has contacts C1 and C2 of which, when the relay is de-energized the contact C1 is open and C2 is closed. The relay D has contacts D1 and D2 of which, when the relay D is de-energized, the contact D1 is closed and D2 is open. The relay E has contacts E1, E2 and E3 of which, when the relay E is de-energized the contacts E1 and E3 are open and the contact E2 is closed. When any of the relays A, B, C, D or E is energized its previously open contacts close and its previously closed contacts open.

The relays A, B, C, D and E, through their switch contacts control an electric circuit which in turn controls the operation of an electric motor 84 connected to the movable element of the variable restriction 36. As illustrated the motor 84 is a two phase alternating current (A.C.) motor. The one winding 86 of the A.C. motor 84 is connected to a suitable A.C. source 88 through a capacitor 90 for providing a 90° shift in the phase of the electric current supplied to said winding. The other winding 92 of the A.C. motor is connected to the same A.C. source 88 through a magnetic amplifier 94 under the control of a twin-triode electronic tube 96.

The magnetic amplifier is arranged to supply electric current to the motor winding 92 which either leads or lags the current in the winding 86 by 90° thereby controlling the direction of operation of the motor 84 while its speed of operation is determined by the magnitude of the voltage applied across said winding 92.

The magnetic amplifier 94 consists of two similar cores $98a$ and $98b$. The core $98a$ has an excitation winding $100a$, a D.C. bias winding $102a$, a control winding $104a$ and an output winding $106a$. The core $98b$ has similar windings designated by similar reference numerals but with a subscript $b$. The excitation windings $100a$ and $100b$ are connected in parallel to the A.C. source 88. The control windings $104a$ and $104b$ are connected in series to the output of the twin triode 96. The bias windings $102a$ and $102b$ are each connected to a D.C. source 108 so that the ampere turns of one bias winding oppose the ampere turns of its associated control winding and the ampere turns of the other bias winding and its associated control winding aid each other. The output windings 106a and 106b are also connected in series.

It can readily be shown that with such a magnetic amplifier the output voltage across the two output windings undergoes a 180° phase reversal upon reversal of the input current direction through the control windings 104a and 104b.

The one end of the serially connected control windings 100a and 100b is connected to one plate 110a of the twin-triode 96 and the other end is connected to the other plate 110b of said twin-triode. The positive side of a D.C. power supply 112 is connected to said tube plates through resistance 114a and 114b. The grid 116a of the tube 96 is connected to ground through resistance 118 and 120 which in turn is connected to an intermediate point in a resistance load connected across the output of the D.C. power supply 112. This resistance load consists of the serially-connected resistance 122, 124 and 126 and the connection between the resistance 122 and 124 is grounded.

Contacts A1 and E1 when closed connect the negative terminal of the D.C. power supply to the tube grid 116a through the resistance 118. Contacts B1 and E2 are connected in series so that when both are closed the positive terminal of the D.C. power supply 112 is connected to said tube grid 116a.

The other grid 116b of the twin triode 94 is connected to the movable center contact 128 of a potentiometer resistance 130 through parallel connected condenser 132 and resistance 134 and a condenser 136 connected in series therewith. The one side of the potentiometer resistance 130 is connected to the ground lead 138 while its other side is connected by lead 140 to the positive terminal of the D.C. supply 112. The movable potentiometer contact 128 is mechanically connected to the output of the motor 84 for movement therewith to provide a voltage feedback to the grid 116b of the twin-triode tube 96 of the same polarity as the control signal supplied to the other grid 116a.

The cathodes 142a and 142b of the twin-triode are connected together through a potentiometer resistance 144, the adjustable center contact 146 of which is connected through a resistance 148 to the ground lead 138.

The feedback grid 116b is connected to the ground lead 138 through an adjustable resistance 150 and a rectifier 152 premitting current flow from the ground. In addition the feedback grid 116b is connected to said ground lead 138 through a rectifier 154 and parallel connected adjustable resistance 156 and 158 having switch contacts D1 and D2 in series. The rectifier 154 is arranged to permit current flow toward the ground lead 138.

Solenoid actuators 160 and 162 are provided for moving the valves 38 and 40 from their full line position illustrated to their dot and dash line positions. For this purpose the solenoids 160 and 162 are connected to the D.C. source 83 through the switch contacts E3. In its dot and dash line position the valve 40 is closed and the valve 38 connects the pressure line 32 directly to the pressure control line 30 via a line 164 having restriction 166 for retarding the pressure transmission through the line 164.

The operation of the control system is as follows. With the inlet normal shock 46 in the position illustrated between the pressure taps 50 and 52 the switch contacts 76, 78, 80 and 82 are all open so that the relays A, B, C, D and E are all de-energized and their switches are in the position illustrated. In this condition, the plate currents in the two halves of the twin-triode 96 are equal and therefore there is no current in the control windings 104a and 104b of the magnitude amplifier.

Now should the shock wave 46 move upstream beyond the pressure tap 50, for example because of a change of aircraft attitude, the increase in pressure at the tap 50 will cause the diaphragm 58 to close contact 76 to energize relay A. Relay contacts A1 and A2 thereupon close and contact A3 opens. Contact A4 also closes but this function will be discussed later. Closure of contact A1 supplies a negative voltage to the grid 116a. This causes a decrease in the plate current from the tube plate 110a. Due to the common cathode connection from the ground line 138 to the two cathodes 142a and 142b a decrease in the plate current in the a section of the tube will cause an increase in the voltage of the grid 116b relative to its cathode 142b to increase the plate current from the tube plate 110b. As a result a current will flow through the amplifier control windings 104a and 104b in a direction from winding 104a to 104b. The magnitude of this control current obviously depends on the magnitude of the grid voltages of the tube 96.

Closing of contact A2 and opening of contact A3 connects the output of the magnetic amplifier directly to the control winding 92 of the two phase motor 84 via the lead 160 and the return lead 162. This connection shorts out the amplifier load resistor 164 and opens the circuit to the motor damping resistor 166.

The motor 84 now operates in a direction to open the bleed valve 36. This results in a decrease in the ratio of the control pressure Pc to the air flow measuring pressure Pb whereupon the fuel regulator operates to decrease the fuel-air ratio of the engine combustion mixture. This fuel-air ratio decrease reduces the pressure on the downstream side of the inlet shock to cause said shock to move downstream into its desired position in the zone between the pressure taps 50 and 52.

At the same time that the motor 84 moves the bleed valve 36 in an opening direction it moves the potentiometer contact 128 to the right thereby decreasing the potential of the contact 128 with the result that there is a flow of current through the resistor 150 from the ground lead 138 thereby decreasing the potential applied to the grid 116b. Thus the polarity of this feedback signal to the grid 116b is the same as that applied to the grid 116a and therefore is in a direction tending to stop the motor 84. This voltage change in effect is differentiated with respect to time by the condenser 136 so that the feedback signal is proportional to the rotational speed of the motor 84. Also the magnitude of this feedback signal depends on the voltage drop across the adjustable resistor 150 so that by making this resistance relatively small the feedback signal is small and the motor 84 has a high average speed for quickly returning the shock wave to its desired position in the zone between the pressure taps 50 and 52. It is desirable that this return motion of the shock 46 back downstream into the inlet be effected quickly to prevent the shock from moving upstream completely out of the inlet since if the shock moves out of the inlet the aforementioned inlet instability phenomenon known as "buzz" is likely to occur.

Now if the inlet shock 46 should move downstream in the inlet beyond the tap 52, the pressure at the tap 52 will decrease and therefore the contact 78 will close to energize the relay B. Relay contact B1 and B2 thereupon close and contact B3 opens.

Closure of contact B1 supplies a positive voltage to the control grid 116a with the result that a control current now flows through the control windings 104a and 104b opposite to the direction of said flow when a negative voltage was supplied to said grid. At the same time since contact B2 closes and B3 opens, the output of the amplifier 94 is connected to the motor control winding 92 in substantially the same manner as described in connection with energization of relay A. Now, however, because of the reversal in the direction of the current flow through the control windings 104a and 104b the phase of the amplifier output current is reversed 180° from what it was upon energization of relay A and therefore the motor 84 now runs in the opposite direction thereby effecting a closing adjustment of the bleed valve 36. This results in an increase in the ratio of the control pressure Pc to the pressure Pb. The fuel regulator thereupon operates to increase the fuel-air ratio of the engine combustible mixture thereby causing the inlet shock 46 to move back upstream to its desired position between the pressure taps 50 and 52.

At the same time that the motor 84 moves the bleed valve 36 in a closing direction it moves the potentiometer contact 128 to the left thereby increasing the potential of the contact 128. There is now a flow of current through the rectifier 154, closed contact D1 and the adjustable resistor 156 to the ground lead 138. The adjustable resistor 156 is made relatively large compared to the resistor 150 whereby the feedback signal to the grid 116b is large and the motor 84 slows down so that the shock wave 46 is returned upstream relatively slowly to a position in the zone between the taps 50 and 52. This slow operation is desirable to minimize the possibility of the shock wave 46 overshooting upstream beyond the tap 50.

If the shock wave 46 moves even further downstream so that it moves downstream of the tap 54, the relay B will remain energized and the switch contacts 80 will close to energize the relay D. Relay D operates to open contact D1 and close contact D2 thereby transferring the feedback signal circuit from resistor 156 to resistor 158. The resistor 158 is set so that it is relatively small whereupon the feedback signal is small and therefore the motor 84 now operates fast in a direction for closing the bleed valve 36.

It is apparent therefore that if the shock 46 only moves a small distance downstream of the tap 52 the rate of increase of the fuel-air ratio to move the shock back upstream to a position between the taps 50 and 52 is slow. If however, the shock moves further downstream so as to go beyond the tap 54 the rate of increase of the fuel-air ratio will be fast until the shock has moved back upstream beyond the tap 54 and then the fuel-ratio increase will continue at a slow rate until the shock reaches a position in the zone between the taps 50 and 52. If the shock goes upstream beyond the tap 50 the circuit set up by the relay A causes a fast decrease in the fuel-air ratio. This fast operation is desirable even though it may cause the shock to overshoot in a downstream direction the zone between the taps 50 and 52 because as previously stated such fast operation may be required to prevent inlet buzz.

It is desired to hold the shock wave 46 in as small a zone as possible and therefore the taps 50 and 52 should be disposed close together. Because of inlet noise conditions and/or because of the characteristics of the inlet normal shock 46 at off-design engine operation, with the taps 50 and 52 close together both relays A and B may be actuated simultaneously when said shock is positioned between said taps. To take care of this possibility the relay C is provided and is connected in series with contact A4 (closed when relay A is energized) and with relay B's control contact 78. Therefore relay C is energized whenever relays A and B are both energized. Upon energization relay C closes contact C1 to short the output of the amplifier 94 and at the same time opens C2 to prevent any direct connection with the motor control winding 92. Accordingly, with relays A and B both energized there is no operation of the motor 84. This is as it should be because the inlet normal shock 46 is then positioned in the desired zone between the taps 50 and 52.

If combustion should be extinguished the inlet shock will move downstream beyond the tap 56. When this happens the relay E closes switch E3 to energize solenoids 162 and 164 so as to move the valves 38 and 40 to their dot and dash line positions. The pneumatic bleed path through the valve 36 is now closed and the entire pressure Pb is immediately supplied to the regulator 26 to provide the maximum fuel-air ratio (determined by the setting of the regulator) for restarting combustion.

The relay E also controls contacts E1 and E2 so that when the burner is extinguished E1 closes and E2 opens to supply a negative voltage to the control grid of the tube 94. Accordingly, although the bleed valve 36 is now ineffective the amplifier 94 is effective to operate the motor 84 for moving the bleed valve toward its maximum open position. This insures a lean fuel-air mixture when combustion has been restarted in the chamber 16 and the inlet shock has moved back upstream of the tap 56. This is desirable since under certain engine operating conditions a fairly lean fuel-air mixture may be sufficient to position the inlet shock 46 within the desired zone between the taps 50 and 52.

With the system described, for any setting of the bleed valve 36, the fuel regulator 26 automatically regulates the engine fuel supply to maintain a predetermined engine fuel-air ratio determined by said setting. Thus the fuel regulator 26 automatically varies the fuel flow as the altitude changes to maintain a fuel-air ratio determined by the setting of the bleed valve 36. It is apparent therefore that the control system for the motor 84 and bleed valve 36 is in the nature of a trimming control on the fuel-regulator 26 in that adjustment of the valve 36 merely varies the magnitude of the fuel-air ratio maintained by said fuel regulator so as to keep the inlet normal shock 46 between the pressure taps 50 and 52. Such a trimming control has the advantage in that even though the circuit for controlling the trimming motor 84 should fail, the fuel regulator 26 would still function to maintain the fuel-air ratio determined by the position of the bleed valve 36.

With the control apparatus described, when the solenoids 162 and 164 are energized to move the valves 38 and 40 to their dot and dash line positions the full pressure Pb is applied to the fuel regulator and therefore the fuel-air ratio maintained by the regulator 26 is a maximum. This is also true when the solenoids 162 and 164 are de-energized and the bleed valve 36 is in its closed position. On the other hand when said bleed valve 36 is in its full open position (solenoids 162 and 164 de-energized) the ratio of the control pressure Pc to the pressure Pb is a minimum and therefore the fuel-air ratio maintained by the regulator 26 is a minimum. It is apparent, therefore, that the control apparatus described inherently includes limits beyond which the fuel-air ratio cannot be adjusted.

With the control apparatus described the fuel-air ratio maintained by the regulator 26 is adjusted by varying the position of the bleed valve 36, this in turn determining ratio of the control pressure Pc to the pressure Pb, proportional to the mass air flow. The fuel-air ratio maintained by the regulator 26 could also be varied by mechanical adjustment within said regulator in which case the full pressure Pb or one proportional thereto could be used as the control pressure. For example, aforementioned Patent No. 2,834,375 discloses a lever (identified by reference number 110 in said patent) which is adjustable to vary the fuel-air ratio maintained by the regulator. It is apparent, therefore, that in lieu of the bleed valve 36, the regulator 26 could be provided with such a lever for adjusting the fuel-air ratio in which case the motor 84 would be connected to this lever for varying said fuel-air ratio.

It should be noted that the feed back signal to the grid 116b also serves to charge the condenser 136. Hence, when the signal to the control grid 116a is cut off by the motion of the inlet normal shock 46 and the motor 84 stops, the condenser 136 discharges to continue to provide a voltage on the grid 116b which is then effective to cause reverse operation of the motor 84 during said condenser discharge. Such reversal of the motor 84 after the inlet normal shock has moved into the zone between the pressure taps 50 and 52 permits faster control action by said motor without danger of overshoot.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. Control apparatus for an aircraft jet engine having an air inlet through which air enters at supersonic velocity during supersonic flight; means for sensing the position of the normal shock wave within the inlet; and means responsive to said sensing means and including a member operable to regulate the pressure within said engine downstream of said normal shock for positioning said shock within a predetermined zone within said inlet, said responsive means also including means for effecting different speeds of operation of said member depending on the direction and magnitude of the departure of said shock from said zone.

2. Control apparatus for an aircraft jet engine having an air inlet through which air enters at supersonic velocity during supersonic flight; means for sensing the position of the normal shock wave within the inlet; and means responsive to said sensing means and including a member operable in one direction or the other to regulate the pressure within said engine downstream of said normal shock for positioning said shock within a predetermined zone within said inlet, said responsive means also including means for effecting a relatively slow operation of said member in a direction for increasing said pressure upon a relatively small movement of the inlet normal shock downstream of said zone and for affecting a relatively rapid operation of said member for increasing said pressure upon a relatively large movement of the inlet normal shock downstream of said zone.

3. Control apparatus for an aircraft jet engine having an air inlet through which air enters at supersonic velocity during supersonic flight; means for sensing the position of the normal shock wave within the inlet; and means responsive to said sensing means and including a member operable in one direction or the other to increase or decrease the pressure within said engine downstream of said normal shock for positioning said shock within a predetermined zone within said inlet; said responsive means also including means for effecting a relatively rapid operation of said member in a direction for decreasing said pressure should the inlet normal shock move upstream of said zone and for effecting a relatively slow operation of said member in a direction for increasing said pressure should the inlet normal shock move downstream of said zone.

4. Control apparatus for an aircraft jet engine having an air inlet through which air enters at supersonic velocity during supersonic flight; means for sensing the position of the normal shock wave within the inlet; and means responsive to said sensing means and including a member operable in one direction or the other to increasee or decrease the pressure within said engine downstream of said normal shock for positioning said shock within a predetermined zone within said inlet; said responsive means including means for effecting a relatively rapid operation of said member in a direction for decreasing said pressure upon movement of inlet normal shock upstream of said zone and for effecting relatively slow operation of said member in a direction for increasing said pressure upon small movement of the inlet normal shock downstream of said zone and for effecting faster operation of said member in a direction for increasing said pressure upon larger movement of the inlet normal shock downstream of said zone.

5. Control apparatus for an aircraft jet engine having an air inlet through which air enters at supersonic velocity during supersonic flight; means operable to provide a signal proportional to the mass air flow into the engine; a member movable to vary the proportionality between said signal and said mass air flow; fuel regulating apparatus including means for regulating the engine fuel supply in response to said signal such that a change in said proportionality results in a change in the engine fuel-air ratio; means for sensing the position of the normal shock wave within the inlet; and means responsive to said sensing means and including said movable member for varying the engine fuel-air ratio for positioning said shock within a predetermined zone within said inlet, said responsive means also including means for effecting different speeds of operation of said member depending on the direction and magnitude of the departure of said shock from said zone.

6. Control apparatus for an aircraft jet engine having an air inlet through which air enters at supersonic velocity during supersonic flight; means operable to provide a signal proportional to the mass air flow into the engine; a member movable to vary the proportionality between said signal and said mass air flow; fuel regulating apparatus including means for regulating the engine fuel supply in response to said signal such that a change in said proportionality results in a change in the engine fuel-air ratio; means for sensing the position of the normal shock wave within the inlet; and means responsive to said sensing means and including said movable member for varying the engine fuel-air ratio for positioning said shock within a predetermined zone within said inlet, said responsive means also including means for effecting a relatively slow operation of said member in a direction for increasing said fuel-air ratio upon a relatively small movement of the inlet normal shock downstream of said zone and for effecting a relatively rapid operation of said member in said direction upon a relatively large movement of the inlet normal shock downstream of said zone.

7. Control apparatus for an aircraft having an air inlet through which air enters at supersonic velocity during supersonic flight; means providing a first signal of the mass air flow into the engine; means operable to provide a second signal which is a fraction of said first signal; a member movable in one direction or the other to increase the proportionality ratio of said second signal to said first signal; fuel regulating apparatus including means for regulating the engine fuel supply in proportion to said second signal such that a change in said proportionality ratio results in a change in the engine fuel-air; means for sensing the position of the normal shock wave within the inlet; and means responsive to said sensing means and including said movable member for varying the engine fuel-air ratio for positioning said shock within a predetermined zone within said inlet, said responsive means also including means for effecting a relatively rapid operation of said member in a direction for decreasing said fuel-air ratio should the inlet normal shock move upstream of said zone and for effecting a relatively slow operation of said member in a direction for increasing said fuel-air ratio should the inlet normal shock move downstream of said zone.

8. Control apparatus for an aircraft having an air inlet through which air enters at supersonic velocity during supersonic flight; means providing a first signal of the mass air flow into the engine; means operable to provide a second signal which is a fraction of said first signal; a member movable in one direction or the other to increase the proportionality ratio of said second signal to said first signal; fuel regulating apparatus including means for regulating the engine fuel supply in proportion to said second signal such that a change in said proportionality ratio results in a change in the engine fuel-air ratio; means for sensing the position of the normal shock wave within the inlet; and means responsive to said sensing means and including said movable member for varying the engine fuel-air ratio for positioning said shock within a predetermined zone within said inlet, said responsive means also including means for effecting a relatively rapid operation of said member in a direction for decreasing said fuel-air ratio should the inlet normal shock move upstream of said zone and for effecting relatively slow operation of said member in a direction for increasing said fuel-air ratio upon small movement of the inlet normal shock downstream of said zone and for effecting faster operation of said member in a direction for increasing said fuel-air ratio upon larger movement of the inlet normal shock downstream of said zone.

9. Control apparatus as recited in claim 8 and including means responsive to even further movement of said inlet normal shock downstream of said zone for connecting said first signal to said fuel regulating apparatus such that the fuel supply is now regulated in proportion to said first signal.

10. Control apparatus for an aircraft ramjet engine having a combustion chamber and having an air inlet through which during supersonic flight air enters at supersonic velocity for combustion within said chamber; means providing a source of fluid under a pressure proportional to the mass air flow through said inlet; means providing a first passage having its one end communicating with said fluid pressure source and having its other end communicating with a lower pressure and having a pair of restrictions serially disposed between said ends; fuel regulating means for varying the supply of fuel to said chamber in accordance with a control pressure; a second passage communicating at one end to said first passage between said restrictions and at its other end with said fuel regulating means to provide the control pressure therefor; motor means operable for varying the magnitude of one of said restrictions to vary said control pressure; a first pressure tap disposed within said engine air inlet and a second pressure tap spaced downstream therefrom within the inlet to define a zone therebetween within which it is desired to position the inlet normal shock during supersonic flight; and means responsive to pressure changes at said first and second taps and operatively connected to said motor means for effecting operation thereof; said responsive means including means responsive to a pressure change at said first tap indicative of movement of the inlet normal shock upstream of said zone for effecting relatively rapid operation of said motor means in a direction for reducing said control pressure, and also including means responsive to a pressure change at said second tap indicative of movement of the inlet normal shock downstream of said zone for effecting relatively slow operation of said motor means in a direction for increasing said control pressure.

11. Control apparatus for an aircraft ramjet engine having a combustion chamber and having an air inlet through which during supersonic flight air enters at supersonic velocity for combustion within said chamber; means providing a source of fluid under a pressure proportional to the mass air flow through said inlet; means providing a first passage having its one end communicating with said fluid pressure source and having its other end communicating with a lower pressure and having a pair of restrictions serially disposed between said ends; fuel regulating means for varying the supply of fuel to said chamber in accordance with a control pressure; a second passage communicating at one end to said first passage between said restrictions and at its other end with said fuel regulating means to provide the control pressure therefor; motor means operable for varying the magnitude of one of said restrictions to vary said control pressure; a first pressure tap disposed within said engine air inlet and a second pressure tap spaced downstream therefrom within the inlet to define a zone therebetween within which it is desired to position the inlet normal shock during supersonic flight; a third static pressure tap disposed further downstream within said inlet; and means responsive to pressure changes at said first, second and third taps and operatively connected to said motor means for affecting operation thereof, said responsive means including means responsive to a pressure change at said first tap indicative of movement of the inlet normal shock upstream of said zone for effecting relatively rapid operation of said motor means in a direction for reducing said control pressure, means responsive to a pressure change at said second tap indicative of movement of the inlet normal shock downstream of said zone for effecting relatively slow operation of said motor means in a direction for increasing said control pressure, and also including means responsive to a pressure change at said third tap indicative of movement of the inlet normal shock downstream of said third tap for effecting a faster operation of said motor means in a direction for increasing said control pressure.

12. Control apparatus for an aircraft ramjet engine having a combustion chamber and having an air inlet through which during supersonic flight air enters at supersonic velocity for combustion within said chamber; means providing a first passage having its one end communicating with the engine motive fluid path adjacent to the upstream end of said chamber and its other end communicating with a lower pressure and having a pair of restrictions serially disposed between said ends; fuel regulating means for varying the supply of fuel to said chamber in accordance with a control pressure; a second passage communicating at one end to said first passage between said restrictions and at its other end with said fuel regulating means to provide the control pressure therefor; motor means operable for varying the magnitude of one of said restrictions to vary said control pressure; a first pressure tap disposed within said engine air inlet and a second pressure tap spaced downstream therefrom within the inlet to define a zone therebetween within which it is desired to position the inlet normal shock during supersonic flight; a third static pressure tap disposed further downstream within said inlet and a fourth static pressure tap disposed still further downstream within said inlet; and means responsive to pressure changes at said first, second and third taps and operatively connected to said motor means for effecting operation thereof; said responsive means including means responsive to a pressure change at said first tap indicative of movement of the inlet normal shock upstream of said zone for effecting relatively rapid operation of said motor means in a direction for reducing said control pressure, means responsive to a pressure change at said second tap indicative of movement of the inlet normal shock downstream of said zone for effecting relatively slow operation of said motor means in a direction for increasing said control pressure and means responsive to a pressure change at said third tap indicative of movement of the inlet normal shock downstream of said third tap for effecting a faster operation of said motor means in a direction for increasing said control pressure, and means responsive to a pressure change at said fourth tap indicative of movement of the inlet normal shock downstream of said fourth tap for connecting said fuel regulator means to said first passage upstream of said restrictions so that the full pressure of the engine motive fluid at the upstream end of said first passage then provides the control pressure for said fuel regulator.

13. Control apparatus as recited in claim 2 and including means for causing a temporary reversal of the direction of operation of said member after said shock has returned to said zone.

References Cited in the file of this patent

UNITED STATES PATENTS 2,796,730    Lawrence _____ June 25, 1957
2,880,579    Harshman _____ Apr. 7, 1959